Patented May 27, 1952

2,598,040

UNITED STATES PATENT OFFICE 2,598,040

4-(1,2-DIHYDROXYETHYL)-1,3-DIOXANE

Otis C. Dermer, Stillwater, Okla., and William J. Nelson, Alpha, Ill., assignors to Cities Service Research and Development Company, New York, N. Y., a corporation of New Jersey No Drawing. Application April 13, 1950, Serial No. 155,788

1 Claim. (Cl. 260—338)

This invention relates to novel organic compounds and more particularly to 4-(1,2-dihydroxyethyl)-1,3-dioxane.

We have discovered that the hitherto unknown 4-(1,2-dihydroxyethyl)-1,3-dioxane may be prepared by the oxidation of 4-vinyl-1,3-dioxane in the presence of formic acid as a solvent and catalyst. The 4-vinyl-1,3-dioxane used as our starting material may be prepared according to the directions given by Gresham and Grigsby in U. S. Patent No. 2,493,964 or it may be prepared as described in the copending application of Kohn and Dermer, Serial No. 75,504 filed February 9, 1949, now abandoned. We prefer, however, to use the latter procedure, which consists essentially in reacting paraformaldehyde with butadiene in the presence of a sulfuric acid catalyst and in an essentially anhydrous medium, since this process avoids the use of pressure equipment and give higher yields of the desired 4-vinyl-1,3-dioxane than the procedure described in the aforesaid patent.

In order that those skilled in the art may more fully understand our invention and the means for carrying it out, the following example is given:

Example 109 ml. of 90 per cent formic acid and 26 ml. of 30 per cent hydrogen peroxide were mixed and treated with 20 grams of 4-vinyl-1,3-dioxane, with continuous motor stirring at a temperature of 40–45° C. for about 20 minutes. The mixture was then held at 40° C. for one hour, let stand overnight, and distilled under reduced pressure down to a volume of about 50 mls. in order to remove formic acid and water. This residue was then treated with 14.4 grams of sodium hydroxide in 27 ml. of water at a temperature of less than 45° C., this treatment being designed to saponify any formates present in the mixture. The product was then extracted with 500 mls. of ethyl acetate, concentrated by distillation of the solvent, and recrystallized from ethyl acetate and from isopropyl ether. A crystalline solid product was obtained having a melting point of 96–98° C. Carbon and hydrogen analysis gave results as follows: carbon, 48.1 and 48.1 per cent; hydrogen 8.2 and 8.3 per cent. Calculated carbon and hydrogen values for $C_6H_{12}O_4$ are: carbon, 48.7, and hydrogen, 8.1.

The new glycol compound, i. e., 4-(1,2-dihydroxyethyl)-1,3-dioxane, gives promise of being an excellent intermediate in the production of plasticizers for various uses and also as an intermediate in other organic syntheses.

Having now described our invention, what we claim as new and useful is:

4-(1,2-dihydroxyethyl)-1,3-dioxane.

OTIS C. DERMER.
WILLIAM J. NELSON.

REFERENCES CITED

The following references are of record in the file of this patent:

UNITED STATES PATENTS

| Number | Name | Date |
|---|---|---|
| 2,493,964 | Gresham | Jan. 10, 1950 |
| 2,500,599 | Bergsteinsson | Mar. 14, 1950 |
| 2,511,942 | Prichard | June 20, 1950 |